United States Patent
Huang et al.

(10) Patent No.: US 8,805,004 B2
(45) Date of Patent: Aug. 12, 2014

(54) METHOD AND APPARATUS FOR DETECTING AND SEPARATING OBJECTS OF INTEREST IN SOCCER VIDEO BY COLOR SEGMENTATION AND SHAPE ANALYSIS

(75) Inventors: Yu Huang, Plainsboro, NJ (US); Joan Llach, Princeton, NJ (US)

(73) Assignee: Thomson Licensing, Issy les Moulineauz (FR)

( * ) Notice: Subject to any disclaimer, the term of this patent is extended or adjusted under 35 U.S.C. 154(b) by 373 days.

(21) Appl. No.: 13/138,091

(22) PCT Filed: Jan. 5, 2010

(86) PCT No.: PCT/US2010/000014
§ 371 (c)(1),
(2), (4) Date: Jul. 5, 2011

(87) PCT Pub. No.: WO2010/080687
PCT Pub. Date: Jul. 15, 2010

(65) Prior Publication Data
US 2011/0268320 A1    Nov. 3, 2011

Related U.S. Application Data

(60) Provisional application No. 61/204,626, filed on Jan. 9, 2009.

(51) Int. Cl.
    *G06K 9/00* (2006.01)
(52) U.S. Cl.
    CPC .................... *G06K 9/00718* (2013.01)
    USPC ............ 382/103; 348/169; 382/199; 382/266
(58) Field of Classification Search
    USPC .............. 382/103, 190, 266; 348/169
    See application file for complete search history.

(56) References Cited

U.S. PATENT DOCUMENTS

| | | | | |
|---|---|---|---|---|
| 7,688,999 | B2 * | 3/2010 | Kim et al. ..................... | 382/103 |
| 7,796,780 | B2 * | 9/2010 | Lipton et al. .................. | 382/103 |
| 7,796,839 | B2 * | 9/2010 | Dewaele ....................... | 382/296 |
| 7,929,017 | B2 * | 4/2011 | Aggarwal et al. ............. | 348/169 |
| 2004/0120581 | A1 | 6/2004 | Ozer et al. | |

(Continued)

OTHER PUBLICATIONS

Huang etal. "Players and Ball Detection in Soccer Videos Based on Color Segmentation and Shape Analysis",Book Series,2007,pp. 416-425.

(Continued)

*Primary Examiner* — Gregory M Desire
(74) *Attorney, Agent, or Firm* — Robert D. Shedd; Reitseng Lin

(57) ABSTRACT

Substantial elimination of errors in the detection and location of overlapping human objects in an image of a playfield is achieved, in accordance with at least one aspect of the invention, by performing a predominately shape-based analysis of one or more characteristics obtained from a specified portion of the candidate non-playfield object, by positioning a human object model substantially over the specified portion of the candidate non-playfield object in accordance with information based at least in part on information from the shape-based analysis, and removing an overlapping human object from the portion of the candidate non-playfield object identified by the human object model. In one exemplary embodiment, the human object model is an ellipse whose major and minor axes are variable in relation to one or more characteristics identified from the specified portion of the candidate non-playfield object.

18 Claims, 8 Drawing Sheets

(56) References Cited

U.S. PATENT DOCUMENTS

2005/0105770 A1* 5/2005 Sumitomo et al. ............ 382/103
2007/0183663 A1* 8/2007 Wang et al. .................. 382/173
2008/0118153 A1   5/2008 Wu et al.
2011/0268320 A1* 11/2011 Huang et al. ................. 382/103

OTHER PUBLICATIONS

Gedikli etal. "An Adaptive Vision System for Tracking Soccer Players from Variable Camera Settings",Proc.of 5th Int'l Conf.Vision Systems, 2007.
D'Orazio etal. "A Ball Detection Algorithm for Real Soccer Image Sequences" 2002 IEEE, pp. 210-213.
Wang etal. "Survey of Sports Video Analysis: Research Issues and Applications", School of Computer Science and Eng.,Univ New South Wales, 2004.
Utsumi etal. "An Object Detection Method for Describing Soccer Games From Video", Graduate Scool of Eng., Univ. of Tokyo, 2002.
Yu etal. "Current and Emerging Topics in Sports Video Processing", 2005 IEEE.
Gong etal. "Automatic Parsing of TV Soccer Programs", 1995 IEEE, pp. 167-174.
Yu etal. "A Ball Tracking Framework for Broadcast Soccer Video", 2003 IEEE, pp. II-273-II-276.
Tong etal. "An Effective and Fast Soccer Ball Detection and Tracking Method", Proc. of the 17 Int'l Conf. on Pattern Recognition, IEEE Computer Society, 2004.
Renno etal. "Shadow Classification and Evaluation for Soccer Player Detection", Digital Imaging Research Centre, Kingston Univ., 2004.
Zhao etal. "Segmentation and Tracking of Multiple Humans in Complex Situation", Univ. of Southern California, Inst. of Robotics and Intelligent Systems.
Liang etal. "A Scheme for Ball Detection and Tracking in Broadcast Soccer Video" PCM 2005, Part I, LNCS 3767, 2005, pp. 864-875.
Choi etal. "Where are the ball and players?:Soccer Game Analysis with Color-based Tracking and Image Mosaick",Dept. of EE, Pohang Univ.pp. 1-15, 1997.
Needham etal. "Tracking Multiple Sports Players Through Occlusion, Congestion and Scale", School of Computing, Univ. of Leeds, UK,pp. 93-102, 2001.
Search Report Dated Mar. 15, 2010.
Comaniciu et al.: "Mean Shift Analysis and Applications", IEEE ICCV'99, 1999, 7 pages.
Haritaoglu et al.: "Hydra: multiple people detection and tracking using silhouettes", 2nd IEEE Workshop on Visual Surveillance, 1999, 6 pages.
Huang et al.: Players and the Ball Detection in Soccer Videos Based on Color Segmentation and Shape Analysis, disclosure form, Thomason Corporate Research, Princeton, Mar. 2007, 10 pages.
Kang et al.: "Soccer player tracking across uncalibrated camera streams", IEEE Int. Workshop on PETS'03, France, 2003, 9 pages.
McKenna et al.: Tracking groups of people, CVIU (80), 2000, 15 pages.
Nementhova et al.: "Preprocessing of ball game video sequences for robust transmission over mobile network", CDMA International Conference (CIC), Seoul, 2004, 5 pages.
Ren et al.: A general framework for 3D soccer ball estimation and tracking, IEEE ICIP'04, 2004, 4 pages.
Coeurjolly et al.: Optimal separable algorithms to compute the reverse euclidean distance transformation and discrete medial axis in arbitrary dimension. vol. 29, No. 3, Mar. 2007, 12 pages.
Jones et al.: "Statistical Color Models with Application to Skin Detection", 1999, 23 pages.
Ozcanli et al.: Augmenting shape with Appearance in Vehicile Category Recognition IEEE 2006, 8 pages.

* cited by examiner

APPEARANCE MODEL OF PLAYERS (REREES), FIELD LINES/CURVES AND THE BALL

MORE HORIZONTALLY

VERTICAL PROJECTION

OVERLAPPING OF PLAYERS MORE HORIZONTALLY

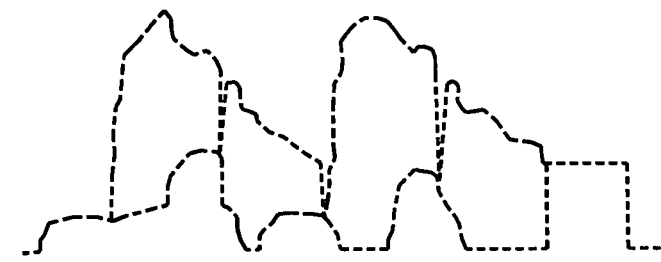
FIG. 6(c) HORIZONTAL COLOR PROJECTION
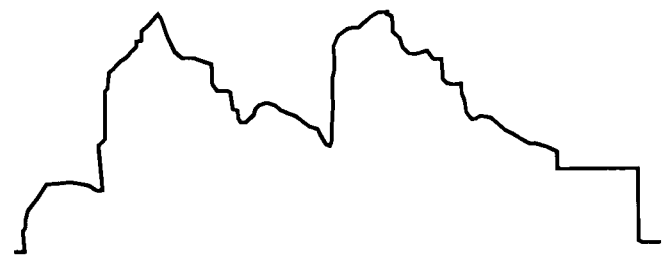
FIG. 6(b) HORIZONTAL PROJECTION
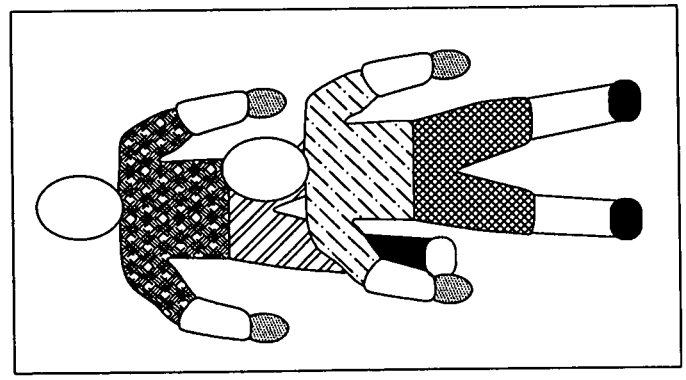
FIG. 6(a)
OVERLAPPING OF PLAYERS MORE VERTICALLY
MORE VERTICALLY

OVERLAPPING OF PLAYERS BOTH VERTICALLY AND HORIZONTALLY

METHOD AND APPARATUS FOR DETECTING AND SEPARATING OBJECTS OF INTEREST IN SOCCER VIDEO BY COLOR SEGMENTATION AND SHAPE ANALYSIS

CROSS-REFERENCE TO RELATED APPLICATIONS

This application claims the benefit, under 35 U.S.C. §365 of International Application PCT/US2010/000014, filed Jan. 5, 2010, which was published in accordance with PCT Article 21(2) on Jul. 15, 2010 in English and which claims the benefit of U.S. provisional patent application No. 61/204,626, filed Jan. 9, 2009.

This application also relates to International Application No. PCT/US07/023317 filed Nov. 6, 2007, which claims the benefit of U.S. Provisional Patent Application No. 60/919,971, filed Mar. 26, 2007.

BACKGROUND OF THE INVENTION

The present invention generally relates to a method and apparatus for detecting objects in a video frame and, more particularly, to a method and apparatus for detecting players and a ball in soccer videos by using color segmentation and shape analysis techniques.

In soccer videos, the soccer players and the ball are the most important objects in that they represent a large amount of information about each instant of a game. Detection and tracking of the players and the ball have been motivated by various applications, such as event detection, tactics analysis, automatic indexing/summarization, and object-based compression.

Known methods for locating the ball as well as the players in soccer videos can be divided in two distinct groups: the first group of methods makes use of fixed cameras, usually calibrated in advance, in a controlled environment, whereas the second group of methods employs regular broadcast videos. While the former can provide better performance, the latter appear to be more flexible.

Since soccer is a spectator sport, the playing field, the lines, the ball, and the uniforms of the players are designed to be visually distinctive in color. In spite of this visual distinctiveness, detection of the players and the ball is not without error. Some approaches in the second group of methods have attempted to mitigate detection difficulties by finding the grass playing field first through the use of color segmentation and post-processing with morphological operations, such as connected component analysis, in order to limit the search area. But errors still occur. Errors can be categorized at least as false alarms and as artifacts. A false alarm refers to the identification and detection of a non-player as a player or the identification and detection of a non-ball as the ball. An artifact arises when the lines on the playing field, for example, merge with portions of a detected player.

Additional difficulties and potential errors arise when the players overlap because the foreground shape becomes complex. In this situation, identification and separation of overlapped players is a challenging problem that has not been addressed to date.

Accordingly, there is a need for a method for substantially eliminating errors that occur in the detection of foreground objects such as players and a ball, for example, in video images including those objects.

SUMMARY OF THE INVENTION

Substantial elimination of errors in the detection and location of overlapping human objects in an image of a playfield is achieved, in accordance with at least one aspect of the invention, by performing a predominately shape-based analysis of one or more characteristics obtained from a specified portion of the candidate non-playfield object, by positioning a human object model substantially over the specified portion of the candidate non-playfield object in accordance with information based at least in part on information from the shape-based analysis, and removing an overlapping human object from the portion of the candidate non-playfield object identified by the human object model. Information relating to a position and other characteristics of the removed overlapping human object is typically stored with the image of the playfield. In one exemplary embodiment, the human object model is an ellipse whose major and minor axes are variable in relation to one or more characteristics identified from the specified portion of the candidate non-playfield object.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 shows an example where two players overlap but more in vertical direction;

Figure 1:
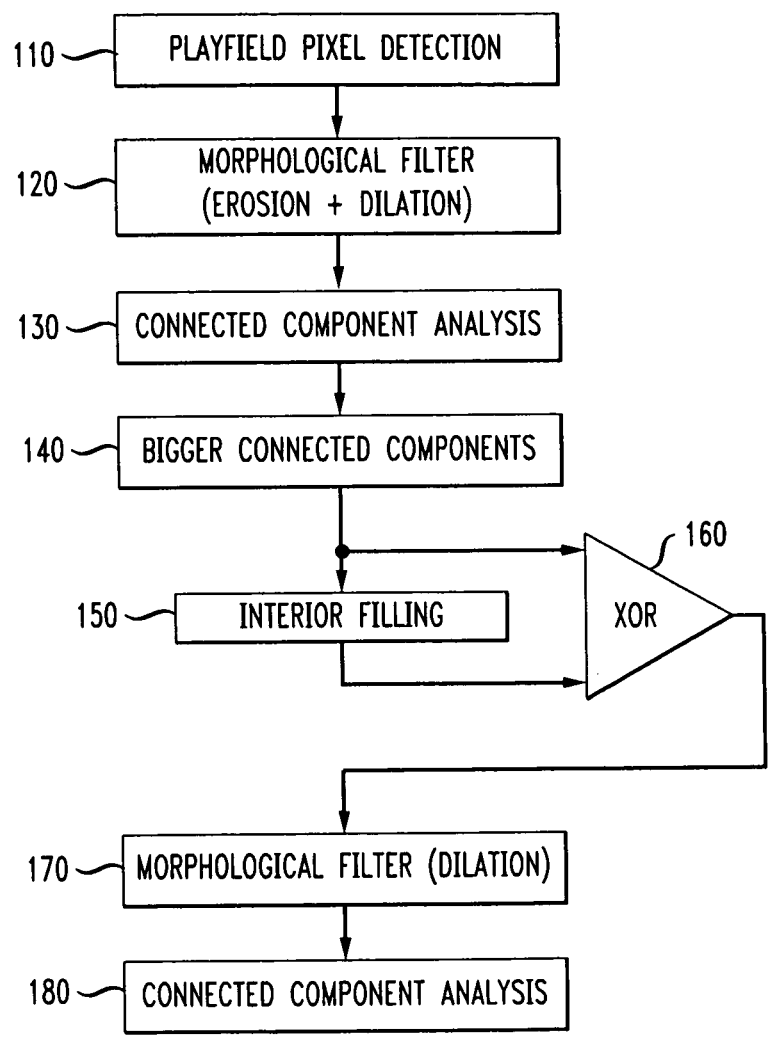
FIG. 1 illustrates an exemplary method for playfield detection and foreground blob extraction in accordance with the principles of the present invention.

The exemplary embodiments set out herein illustrate preferred embodiments of the invention, and such exemplary embodiments are not to be construed as limiting the scope of the invention in any manner.

DETAILED DESCRIPTION

The present description illustrates the principles of the present invention. It will thus be appreciated that those skilled in the art will be able to devise various arrangements that, although not explicitly described or shown herein, embody the principles of the disclosure and are included within its spirit and scope.

It should be understood that the elements shown in the figures may be implemented in various forms of hardware, software, or combinations thereof. Preferably, these elements are implemented in a combination of hardware and software on one or more appropriately programmed general-purpose devices, which may include a processor, memory and input/output interfaces.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read only memory ("ROM") for storing software, random access memory ("RAM"), and non volatile storage.

Other hardware, conventional and/or custom, may also be included in the realization of the invention. For example, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the specified function. It is thus regarded that any means that can provide those functionalities is equivalent to those shown and described herein.

It will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown herein.

Finally, all examples and conditional language recited herein are intended to aid the reader in understanding the principles of the invention and the concepts contributed by the inventor for furthering the state of the art. The principles of the present invention are therefore to be construed as being without limitation or restriction to such specifically recited examples and conditions.

In this description of the invention, it is to be understood that terms such as "playfield", "playing field", and "soccer field" are intended to be synonymous in referring to the pitch upon which the soccer match is played. It is further understood that references to "players" are intended to include individuals on the playing filed including players and referees alike.

When identifying a region or object of interest, especially for foreground objects, the term "blob" is used. This term is well understood in the technical field of this invention. A "blob" is intended be generally a region of a connected grouping of one or more pixels. In this application, the term "candidate object" is intended to be synonymous with the well-known term "blob". To every extent possible, the former term has been used in this application to avoid any unintended problems in translation and comprehension.

Although the invention herein is described in terms of soccer, it will be appreciated by persons skilled in the art that the principles of the invention are not limited to a soccer field and that they can be applied to other play scenes, including but not limited to basketball, baseball, football, rugby, lacrosse, field hockey, water polo, tennis, and volleyball. OF course, it will also be appreciated that these principles of the invention can be applied equally well to activities outside of team activities mentioned above, including activities such as mountain and rock climbing, skiing, snowboarding, to name but a few.

As mentioned above, perhaps the most informative feature in a soccer video is color: the playfield is green, the lines are white, the ball is generally white or bright, and the teams as well as the referee are dressed at least in jerseys that allow them to be distinguished easily. In scenes from other activities such as those mentioned above, the colors of the playfield (background) and the colors of non-playfield (foreground) may be different from those that appear in a soccer match. For example, while the color of a soccer ball is normally or predominately white, the color of a basketball is normally a medium brown to burnt orange shade. Similarly, the field of play in basketball is usually light brown or tan and the playing lines are generally either black or white.

For the duration of play captured in the video images, it is reasonable to assume that all objects of interest (OOI) such as the ball, the players, and the referees are supposed to be inside the playing field area. Therefore, extraction of playfield based on color segmentation plays an essential role in automatic soccer video analysis.

There are many ways to represent the playing field color. One relatively simple way to represent the color of the soccer field is by using a constant mean color value obtained through prior statistics over a large data set. The color distance between a chosen pixel in a video frame and the mean value of the field is used to determine whether or not that chosen pixel belongs to the set of pixels for the playing field. Since the soccer field is roughly green colored, the hue component defined in Smith's hexagonal cone model can be used to detect the green colored pixels given a certain range. It is understood that, while the soccer field has a green coloration in general, it may exhibit some differences in hue based upon appearances caused by lighting patterns (e.g., natural versus artificial lighting and shadows) and field characteristics such as worn out areas, grass mowing patterns, grass growing patterns and the like.

A histogram can be employed as a non-parametric color model for playfield. In certain applications it is preferable to find a dominant color assuming that the field has a uniform color of green and occupies the largest area in each frame. Single Gaussian statistics or a mixture of Gaussian (MoG) statistics can be learned to represent a color model of the playfield and can be adapted by an Expectation-Maximization (EM) algorithm incrementally. These techniques are well-known in the art and will not be described further in detail herein.

Reference is now made to the drawings, and more particularly to FIG. 1, in which an exemplary method is shown for detecting and extracting the playing field from a soccer video image frame. Headings are used to assist the reader in locating and identifying general operations performed throughout the inventive method.

Playfield Pixel Detector

Playing field detection is carried out in step 110 of the method shown in FIG. 1. Detection is accomplished by a simple histogram learning technique applied to a playfield pixel from the image frame. In this technique, a color histogram having N bins per channel in the red-green-blue (RGB) color space is defined as a generic color model. Channel in this context refers to the red, green, and blue components. This generic color model can be developed in many ways known in the art such as by a priori learning based on a training set of soccer game videos. In such a training set of videos, playfield pixels and non playfield pixels may be labeled as such in a manual or semi-supervised manner. Thereafter, based on its RGB color vector, each labeled playfield pixel is placed into the appropriate bin of the playfield histogram. A similar process is carried out for the pixels labeled as non-playfield. The histogram counts are converted into a discrete conditional probability distributions in the usual manner as follows:

$$P(rgb/\text{playfield}) = \frac{f(rgb)}{T_f}, \text{ and } P(rgb/\text{non\_playfield}) = \frac{n(rgb)}{T_n},$$

where f(rgb) gives the count in bin rgb of the playfield histogram, n(rgb) is the count in bin rgb from the non-playfield histogram, and $T_f$, and $T_n$ are the total counts defined by summing the individual counts over all the bins in the playfield and non-playfield histograms, respectively.

Using the probability information above, a playfield pixel classifier can be realized by using a standard likelihood ratio approach using conditional probabilities. For example, a particular RGB value is labeled playfield if:

$$\frac{P(rgb/\text{playfield})}{P(rgb/\text{non\_playfield})} \geq \phi,$$

where $0 \leq \phi \leq 1$ is a threshold that can be adjusted between the limits in order to achieve an appropriate trade-off between correct detections and false positives. A false positive occurs when, for example, a non-playfield pixel is labeled as a playfield pixel. In contrast, a false negative occurs when, for example, a playfield pixel is labeled as a non-playfield pixel.

Threshold $\phi$ can then be expressed as a function of the a priori probabilities and the costs of false positives and false negatives as $$\phi = \frac{c_p P(\text{non\_playfield})}{c_n P(\text{playfield})},$$

where $c_p$ and $c_n$ are application-dependent costs of false positives and false negatives, respectively. The a priori probability for the playing field can be derived as $T_f/(T_f+T_n)$, while the a priori probability for the non-playing field can be derived as $T_n/(T_f+T_n)$.

The number of bins per channel, N, and the detection threshold, $\phi$, can be chosen based upon a receiver operating characteristic (ROC) curve that plots the probability of correct detection against the probability of false detection and the number of bins per channel is varied across a range of values such as for N as 32 to 256 bins. The probability of correct detection is defined as the fraction of pixels labeled as playfield that are thereby correctly classified. The probability of false detection is defined as the fraction of pixels labeled as non-playfield that are thereby incorrectly classified. Detection performance improves as the area under an ROC curve increases. From experimental practice, it has been found that N=128 bins gives suitable results. It is then possible to choose a suitable operating point to achieve a suitable, application dependent trade-off between the probability of correct detection and the probability of false detection (i.e., false positives). The value of detection threshold $\phi$ corresponding to the operating point is then used for the pixel classification in the equation above. In one example from experimental practice, the number of bins N=128 and the threshold $\phi$=0.1 have been selected to achieve a probability of correct detection at 0.935 and a probability of false detection at 0.057.

As a result of the playfield pixel detection in step 110, each frame is processed to yield a binary mask. Pixel values are classified as either a binary "1" or a binary "0".

Playfield Extraction

Morphological filtering, including the operations of erosion and then dilation, is applied to the binary mask of the frame in step 120 to eliminate the noise and makes regions homogeneous. Morphological filtering is a known process for image enhancement that tends to simplify the image and thereby facilitate the search for objects of interest. It generally involves modifying the spatial form or structure of objects within the image. Dilation and erosion are two fundamental morphological filtering operations. Dilation allows objects to expand, thus potentially filling in small holes and connecting disjoint objects. Erosion is the complementary operation to dilation in that erosion shrinks objects by etching away (eroding) their boundaries. These operations can be customized for each application by the proper selection of a structuring element, which determines exactly how the objects will be dilated or eroded.

Connected components analysis (CCA) in step 130 is employed to scan the binary mask and group the mask pixels into connected components based on pixel connectivity. That is, the pixels identified in a connected component share the same binary values and they are in some way connected with each other, such as 4-connectivity or 8-connectivity also called 4- and 8-point neighborhood systems, respectively. Connected components analysis tools and techniques are well known in the art and will not be disclosed further herein.

The playfield is understood to include several connected components in the image, each of them is bigger in size than a given area threshold in step 140. This step allows all the playfield components to be tested against a threshold so that smaller playfield components can be removed. The playfield mask is obtained in step 150 by filling the interior of each bigger connected component defined by the connected component boundary. In step 160, an exclusive-OR function is applied to the output masks in steps 140 and 150 in order to produce a mask of the extracted playfield areas.

Foreground Blob Detection

Foreground blob extraction is then performed in steps 170 and 180. A blob is simply a region of a connected grouping of pixels. Ideally, the non-playfield pixels inside the extracted playfield areas from step 160 are expected to be foreground pixels that can be grouped into different foreground blobs by connected component analysis. Since the ball is a relatively small object of interest and generally less than 30 pixels in size, it is only possible to perform dilation before grouping pixels into different blobs only to make regions homogeneous. Performing erosion at this stage in the morphological filtering step would damage the image by possibly erasing the ball. Noise in certain areas of the image must be removed later by shape analysis and use of an appearance model of the true objects.

Object Appearance

In long view shots of the field, all the lines and arcs on the playing surface such as the touch, center, penalty area, and bye lines appear white or nearly white. Similarly, for such long view shots of the field, the ball appears nearly white regardless of any patterns or logos that are on it. A simple method to identify white pixels in each foreground blob is as follows:

$$W(x, y) = \begin{cases} 1, & \text{if } (r(x, y) - 1/3)^2 + (b(x, y) - 1/3)^2 < a, \text{ and if } I(x, y) > b, \\ 0, & \text{otherwise} \end{cases}$$

where $r(x, y)$ and $b(x, y)$ are normalized red and blue component for a particular pixel $(x, y)$, $I(x, y)$ denotes the intensity value of pixel $(x, y)$, and $W(x, y)$ is the white pixel mask for the pixel $(x, y)$. The threshold values a and b are determined empirically.

Figure 2:
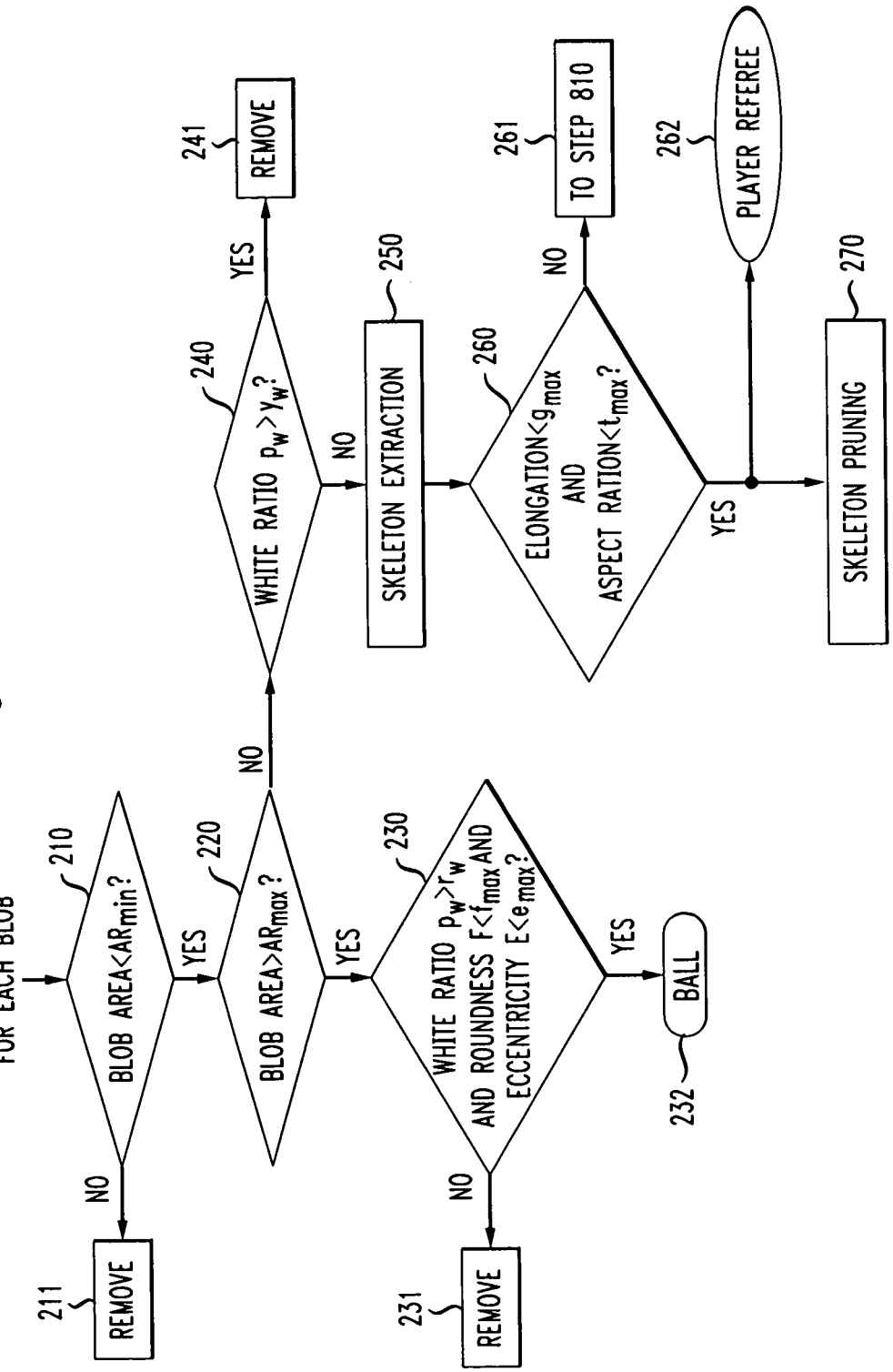
FIG. 2 illustrates an exemplary method for detecting isolated players and an isolated ball together with artifact removal in accordance with the principles of the present invention.

For the players, goalkeepers, and referees, their uniforms are distinctive in color to allow sufficiently accurate identification of the object of interest. Usually the appearance of the uniform can be subdivided into three regions: a shirt region, a region including the pair of shorts, and a region including the pair of socks. It is contemplated that an additional region can be applied to goalkeepers to define a region including the goalkeeper's gloves. Templates for these regions are known and can be learned beforehand to generate color histogram models for each respective region for the two sets of field players, the two opposing goal keepers, and the group of referees. FIG. 2 shows examples of appearances for the various objects. It will be understood that the term "player" or "players" is intended to include the players and goalkeepers and the referees, unless it is expressly stated herein to the contrary.

Basic Shape Analysis

Region properties for each blob can be categorized by a few basic shape descriptors as follows:

1. Perimeter, P, the number of pixels in the boundary;
2. Area, A, the number of pixels;
3. Major/Minor axes, $C_L$ and $C_S$, where $C_L$ is the longest chord and $C_S$ is the chord perpendicular to $C_L$;
4. Roundness, F, defined as $F=P^2/(4\pi A)$; and
5. Eccentricity, E, defined as $E=C_L/C_S$.

The region properties for each blob as described above are used primarily in the inventive method described herein for isolated ball detection as described below.

Skeletons and the Distance Transform

Skeletons provide an intuitive, compact representation of a shape. One of the important features of skeletons is separation of the topological properties for a shape from the geometric properties of that shape. A skeleton, as its name implies, is a set of curves that approximates the local symmetry axis of the shape for the object of interest. An alternative definition for a skeleton is based on a distance transform.

The distance transform or distance map is a function that, for a given point inside a shape, computes the distance from the given point to the point on an outline of that shape closest to the given point. For a foreground binary mask W of size m×n, $\overline{W}$ denotes the complementary mask of W in the sense that $\overline{W}$ includes the set of background pixels. Its squared distance transform (SDT) is given by the shape map $H=\{h(x, y)\}$ as follows:

$$h(x,y) = \min\{(x-i)^2 + (y-j)^2; 0 \le i < m, 0 \le j < n, (i,j) \in \overline{W}\}.$$

For a set of foreground pixels V and a picture $F=\{f(x,y)\}$ of size m×n, it is shown that either $f(x,y)$ is set to the squared distance transform value $h(x, y)$ when the pixel $(x,y)$ belongs to the foreground pixel set V or $f(x,y)$ is set to 0 otherwise. As a result, the reverse Euclidean distance transform (REDT) of V consists of the set of points W such that:

$$W = \{(x,y) | \max\{f(i,j) - (x-i)^2 - (y-j)^2\} > 0, \text{for } 0 \le i < m, 0 \le j < n, \text{and } (i,j) \in F\}.$$

Thus, the shape map $H=\{h(x,y)\}$ can be computed using the picture F as follows:

$$h(x,y) = \max\{f(i,j) - (x-i)^2 - (y-j)^2, \text{for } 0 \le i < m, 0 \le j < n, \text{and } (i,j) \in F\}.$$

It is then possible to obtain the set of points W by extracting all pixels of strictly positive values from the shape map H computed above Skeleton Descriptor Given squared distance transform of the shape $H=\{h(x,y)\}$, its skeleton Ske is defined as follows:

$$Ske = \Big\{ (x, y) \mid \exists (i, j),$$
$$\text{where}$$
$$(x - i)^2 + (y - j)^2 < h(x, y),$$
$$\text{and}$$
$$\max_{(u,v)} \{h(u, v) - (x - u)^2 - (y - v)^2\} = h(x, y) - (i - x)^2 - (j - y)^2 \Big\}.$$

By comparing the above equation with the definition of the REDT discussed above, it can be seen that it is possible to obtain the skeleton Ske by applying the reverse Euclidean distance transform operation to the squared distance transform of the shape in which only the upper envelope elliptic paraboloids are marked.

The reverse Euclidean distance transform is based on a Power diagram construction as follows:

Given a set of sites $S=\{s_i\}$, the Voronoi diagram is a decomposition of the plane into cells $C=\{c_i\}$ (one cell per site) such that, for each point p in the open cell $c_i$, it is closer to the site $s_i$ than to any other site $s_j$ ($i \ne j$).

The Power diagram is a kind of Voronoi diagram based on the metric induced by a power function defined by $$\sigma_i(p) = d(p, s_i) - f(i)^2,$$

where $f(i)$ is a radius associated to each site $s_i$, and $d(\cdot)$ is the Euclidean distance function. The Power labeling assigns, to each point of the plane, the index of the cell containing it in the Power diagram.

The reverse Euclidean distance transform is linked to computation of nonempty cells in the Power labeling. Consequently, the skeleton corresponds to the nonempty cells in the Power Diagram.

Based on an extracted skeleton, additional descriptors useful for shape analysis can be computed as follows:

1. Length of the skeleton, $L_s$;
2. Covering, $C_{Ske}$, defined as the number of pixels in the Power labeling associated with a skeleton point);
3. Maximal thickness of the skeleton, $d_{max}$, which corresponds to the maximum thickness of the corresponding blob;
4. Elongation, $A/(2d_{max})^2$; and
5. Aspect ratio, $L_s/d_{max}$.

The extracted skeleton and its descriptors are used primarily in the inventive method described herein for player detection and artifact removal by skeleton pruning as described below. That is, the skeleton is generally employed herein to remove blobs that do not represent possible players, referees, or the ball.

Isolated Ball Detection

Basic shape analysis proves to be the more important tool for isolated ball detection. The ball appears as a relatively small blob in long distance frames of the video thereby rendering the use of skeleton descriptors unreliable.

There appears to be a predefined range for the area A of a blob representing the ball. That range is dependent upon the camera configuration in relation to the playing field. Furthermore, the proportion of white pixels W(x,y) detected by the color model in the blob corresponding to a ball indicates the possibility for that blob being a ball. Roundness F and eccentricity E for the blob of interest should be close to 1.0 in order for that blob to be considered as a ball. The latter two characteristics are different from E and F for disconnected segments of field lines.

With this in mind, it is possible to detect a particular blob as a ball by computing the function B as follows:

$$B = \begin{cases} 1, & \text{for } p_W > r_W \text{ and } ar_{min} < A < ar_{max} \text{ and } F < f_{max} \text{ and } E < e_{max}, \\ 0, & \text{otherwise} \end{cases}$$

where $p_W = C\{(x, y) | W(x, y) = 1\}/A$, $C\{\cdot\}$ is a count of the number of white pixels, and all the thresholds, $r_w$, $ar_{min}$, $ar_{max}$, $f_{max}$, and $e_{max}$, are determined empirically. When function B equals 1, the blob is detected as a ball; otherwise, the blob is detected as not being a ball.

The shape analysis process as applied for isolated ball detection is shown in FIG. 2. The process in FIG. 2 is applied to each blob as follows. In step 210, in order to remove those blobs that are too small to be a ball and a human object, the blob area A may be compared with a minimum threshold $ar_{min}$. If the blob area A exceeds the threshold, then processing of the blob continues to step 220; otherwise the blob is removed (i.e., B=0) as shown in step 211.

In step 220, the blob area A is compared with a maximum threshold $ar_{max}$. If the blob area A is less than the threshold, then processing of the blob continues to step 230; otherwise the blob is sent for further processing to step 240.

In step 230, the white ratio $p_W$, the roundness F, and the eccentricity E of the blob are tested against their respective thresholds, $r_W$, $f_{max}$, and $e_{max}$, as shown in the equation above. In the event that all the characteristics being tested in step 230 meet their respective criteria as shown therein, then it is decided in step 232 that the blob of interest is a ball (i.e., B=1); otherwise the blob is removed (i.e., B=0) as shown in step 231.

Isolated Player and Referee Detection

Figure 4:
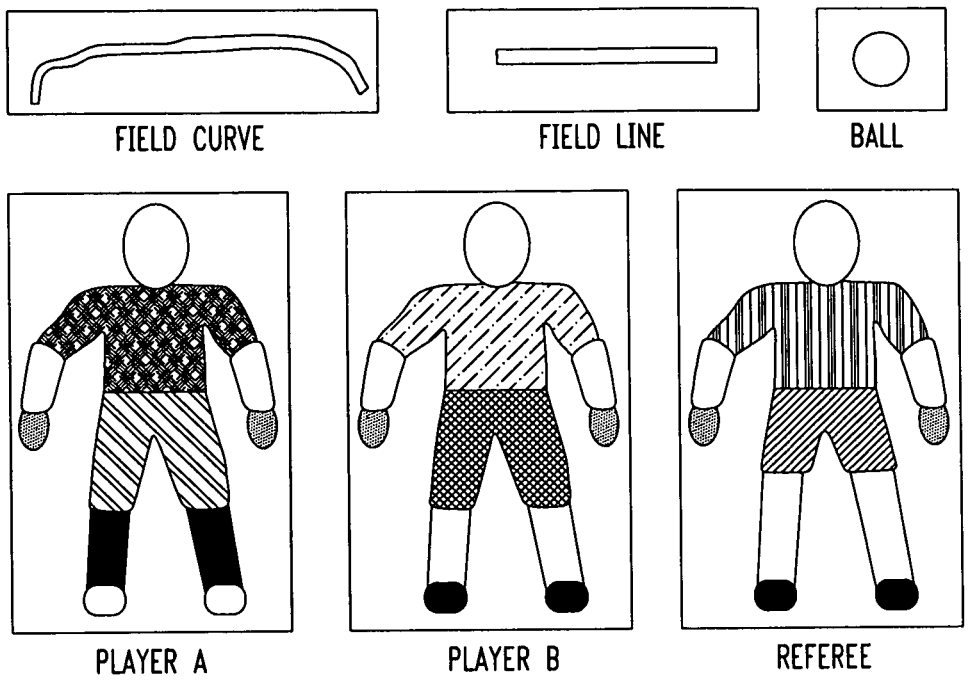
FIG. 4 illustrates appearance models of field lines/curves, the ball, and the players (including referees)

In general, an isolated player or referee blob tends to exhibit an elliptical shape. As such, the player blob, when represented by its skeleton, is recognizable with a limited elongation and a limited aspect ratio. These constraints can also help in removing some fragments of field lines or curves that have been erroneously merged into the player blob. Exemplary field lines, field curves, and the ball are shown in FIG. 4 together with simplified player and referee appearance models.

Since the field lines look white or nearly white in color and since the similarly colored ball has been detected, it is possible to again use the proportion of white pixels as an index for detecting non-player blobs. As discussed above with respect to the ball, an area range for the player or referee blob is predefined according to the camera configuration. That range is dependent upon the camera configuration in relation to the playing field.

Removal of field lines and detection of players or referees is depicted on the right side of FIG. 2 in steps 240 through 270. In step 240, the white pixel ratio for the blob of interest is compared with a threshold $y_W$. If the threshold is exceeded, the blob of interest is removed as being a non-player in step 241. If, on the other hand, the white ratio is less than or equal to the threshold in step 240, the blob of interest is further processed in step 250.

In step 250, the skeleton extraction is performed on the blob of interest as described above. After the additional descriptors are measured for the skeleton of the blob of interest, the elongation and/or aspect ratio for the blob are tested against their respective thresholds, $g_{max}$ and $t_{max}$, as shown in step 260. If either or both descriptors are less than their respective thresholds, then the individual player or referee is detected as shown in step 262. If either one of the descriptors or both of the descriptors are greater than or equal to the respective threshold, then the blob of interest is removed as shown in step 261, if overlapped/occluded player/referee detection will not be performed. However, if overlapped/occluded player/referee detection will be performed, the blob of interest is not removed and the process proceeds to step 810 in FIG. 8, which will be described in detail later.

Figure 3:
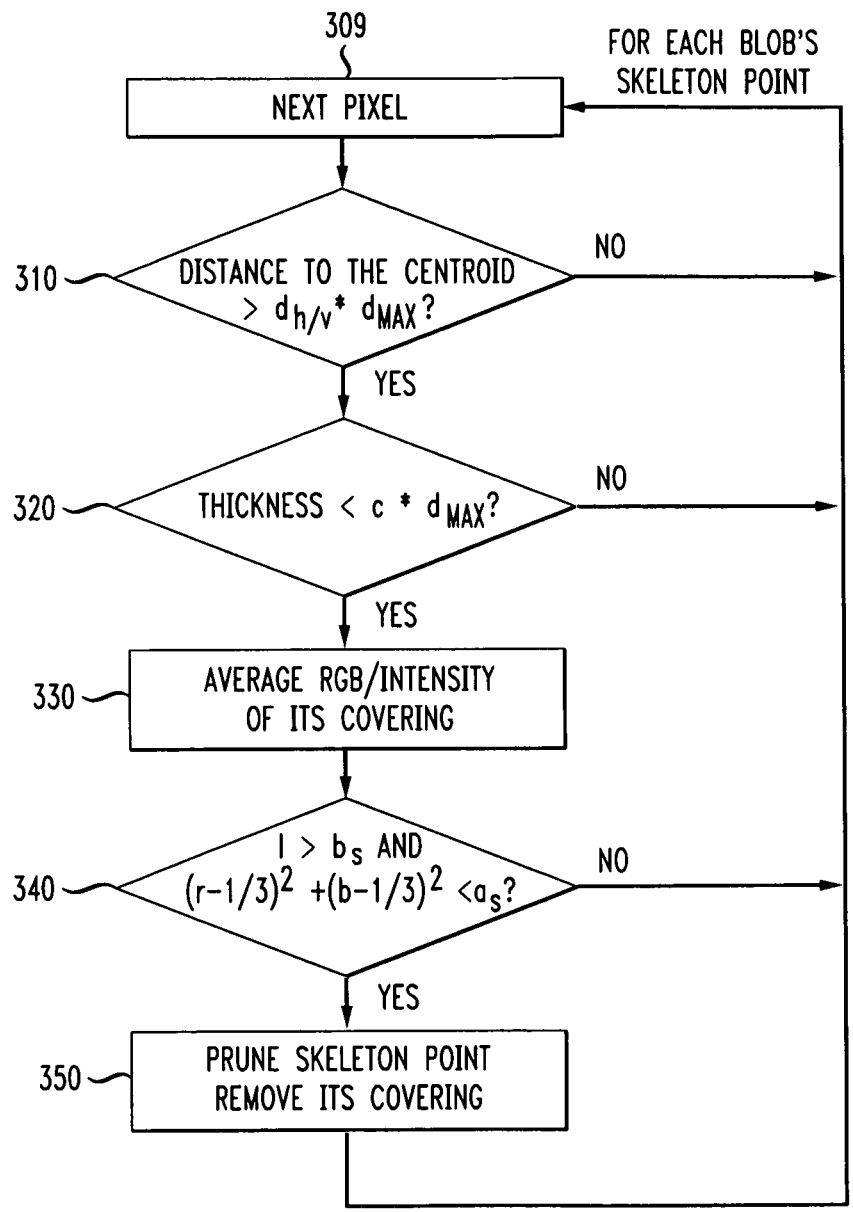
FIG. 3 illustrates an exemplary detailed method for artifact removal in accordance with the principles of the present invention.

At this point in the process, skeleton pruning is employed in step 270 and FIG. 3 to remove errors caused by artifacts.

Skeleton Pruning

When the individual player (including referee) blob merges with fragments of field lines or curved lines (e.g., the curved lines at midfield or above the penalty area), shape analysis does not appear to generate the correct result in identifying the blob. The blob of interest may be removed incorrectly as a non-player blob by using global shape descriptors. Artifacts caused by field line fragments may trigger a bias that will hinder the location of the player. For reference, examples of the appearance of field lines and curves are shown in FIG. 4.

In accordance with an aspect of the present invention, artifacts caused by field lines and curves are cut-off and removed by utilizing appearance priors and skeleton information and pruning. Step 270 in FIG. 2 shows the step of skeleton pruning for removing such artifacts. FIG. 3 shows, in more detail, an exemplary method including a set of steps for performing the skeleton pruning in step 270.

In general, the width of a field line or curve appears to less than the width of a player body in the long view shot. As a result, it is possible to check at every skeleton point of the blob of interest whether the thickness at that point is small compared with the maximum skeleton thickness. Specifically, the thickness of the blob's skeleton at the point is measured and tested against the product $c \cdot d_{max}$, where c is thickness factor. If it is the skeleton width is less than the product $c \cdot d_{max}$, then the average values of RGB components for all pixels covered by this skeleton point (Power labeling) are calculated. It has been observed in experimental practice that, when this skeleton point corresponds to a fragment of field lines, the average RGB component values of the skeleton point are close to those of the white color.

In order to avoid pruning an area incorrectly, distance constraints are added to the method in at least one implementation. From experimental practice, it is understood that the pruned skeleton is relatively far away from the human body centroid, which corresponds to the skeleton point with the maximal covering value. That is, the distance from the pruned skeleton point to the skeleton point with the maximal covering value is bigger than each of the horizontal distance $d_h \cdot d_{max}$, and the vertical distance $d_v \cdot d_{max}$, where $d_v$ and $d_h$ are distance factors and where $d_{max}$ is the maximum thickness of the skeleton as described above.

The process steps shown in FIG. 3 are performed for the individual skeleton points or pixels in each blob. The process is entered in step 309 for the next pixel. Control is then transferred to step 310.

In step 310, for each skeleton point of the blob of interest, the distance from the skeleton point to the skeleton point with the maximal covering value is measured and tested to determine whether it exceeds each of the horizontal distance $d_h \cdot d_{max}$ and the vertical distance $d_v \cdot d_{max}$. The skeleton point having the maximal covering value normally coincides with the centroid of the blob. If there is more than one skeleton point having the maximal covering value, selects the one that is closest to the centroid of the blob. If the horizontal distance or the vertical distance is exceeded by the distance to the skeleton point with the maximal covering from the particular skeleton point, then the method proceeds to step 320. Otherwise, a new skeleton point is chosen for measurement and testing in the blob of interest and testing resumes at step 309.

In step 320, the thickness of the blob at the skeleton point under test is checked against the product $c \cdot d_{max}$. If the thickness is less than the product $c \cdot d_{max}$, then the method proceeds to step 330 where the average intensity values of RGB components for all pixels covered by this skeleton point (Power labeling) are calculated. If the thickness is greater than or equal to the product $c \cdot d_{max}$, then a new skeleton point is chosen for measurement and testing in the blob of interest and testing resumes at step 309.

In step 340, the intensity from step 330 is tested against threshold $b_s$. Also, the normalized red and blue component values of the skeleton point are tested against threshold according to the formula, $$(r-\tfrac{1}{3})^2 + (b-\tfrac{1}{3})^2 < a_s.$$

If both tests are true, then the method proceeds to step 350 wherein the skeleton point under test is pruned and its covering is removed. If either test or both tests in step 340 fail, then a new skeleton point is chosen for measurement and testing in the blob of interest and testing resumes at step 309. Step 340 uses the white pixel proportion in the covering of the skeleton point to determine whether or not to prune part of the skeleton.

In another embodiment, if one or more of the three tests at steps 310, 320, and 340 are positive, the skeleton point is pruned and its covering removed.

It is contemplated that the ordering of the steps 310, 320, 330, and 340 can be changed without any loss in accuracy of the technique. For example, it is possible to test the thickness in step 320, then test the average RGB intensity in step 330, then test the intensity information in step 340, all before testing the distance to the centroid in step 310.

Overlapped/Occluded Player and Referee Detection

The terms "occlusion" and "overlap" are intended to be used interchangeably without limitation or loss of generality when discussing the occlusion of the image of one player caused by the overlap of the one player's image by the image of another player or object of interest. Examples of various types of player overlap are shown in FIGS. 5(a), 6(a), and 7.

Figure 5A:
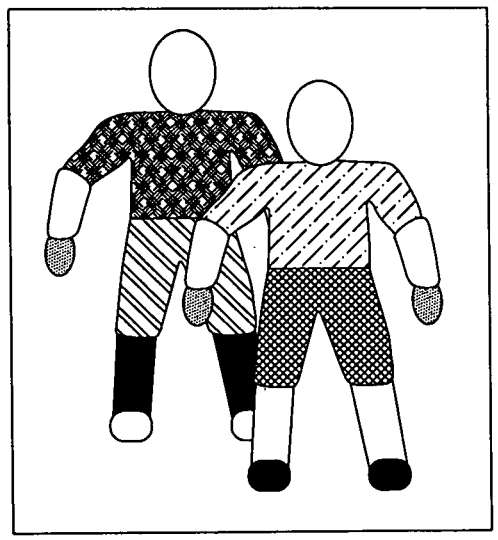
FIG. 5 shows an example where two players overlap but more in horizontal direction.

FIG. 5(a) shows an image of two players overlapping in a substantially horizontal manner. When the players overlap horizontally, as shown in FIG. 5(a), the players overlap or occlude one another while standing substantially side-by-side, with one player slightly in front of the other. For a horizontal overlap, various methods can be applied to achieve blob separation. In a method from experimental practice, a player's head is detected at the boundary of the blob and then one or more vertical boundaries are determined between the overlapping players by introducing an elliptic shape analysis. This technique is described in more detail below.

FIG. 6(a) shows an image of two players overlapping in a substantially vertical manner. When the players overlap vertically, as shown in FIG. 6(a), the players overlap or occlude one another while one player is standing substantially in front of, and possibly a slight amount to the side of, the other player. For a vertical overlap, various methods can be applied to achieve blob separation. In a method from experimental practice, a nonparametric statistical technique can be employed. This technique is described in more detail below.

Figure 7:
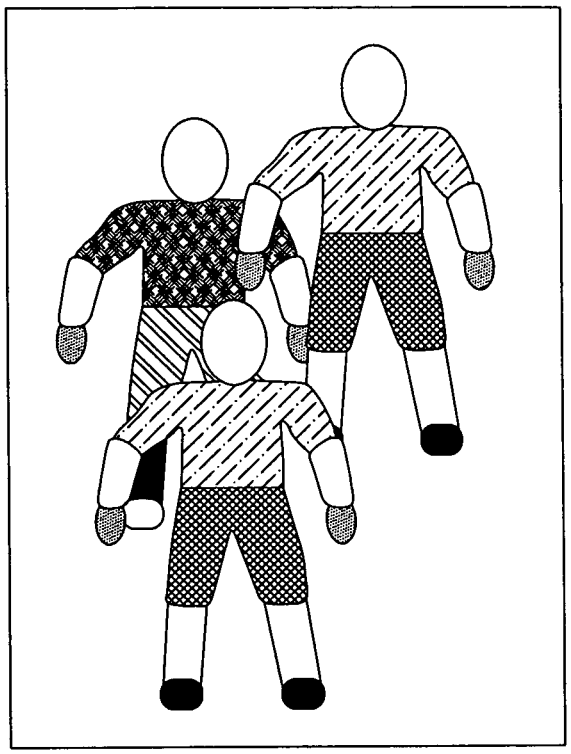
FIG. 7 shows an example where three players overlap both horizontally and vertically.

FIG. 7 shows an image of several players overlapping in a combination of a substantially vertical manner and a substantially horizontal manner. When both vertical and horizontal overlapping occur, horizontal separation is attempted first and then vertical separation is executed on the un-explained part of the blob. For each horizontal separation that is performed, pixels enclosed by the generated elliptic blob for a horizontal object or player are removed together with any disconnected residual pixels remaining after the player blob removal. This technique is described in more detail below.

Several assumptions have been made in order to simplify the presentation of the inventive methods herein. First, it is assumed that the processing for multiple player occlusions is performed for partial occlusion situations, that is, when significant portions of each player are visible in the image. If occlusion becomes too extensive so that a significant amount of the image of one player is no longer visible in the image, then the occluded player is neglected for further player image extraction. At this time, no objective measure is defined for being a significant amount of occlusion. Even if one were to suggest that an amount of occlusion exceeding 50% is significant, such a measure would not necessarily convey the importance of knowing what part of the player is occluded. In such a subjective case, a player having both legs occluded may be considered significant whereas the occlusion of one arm and one leg may not necessarily be considered occluded. Of course, occlusion of both shirts and shorts on a player would be far more significant than the occlusion of just one or the other. It is contemplated within the scope of the disclosed invention that the techniques herein together with the use of additional information derived from player tracking can be utilized to extract player images that are significantly occluded, wherein occlusion exceeds 50%, for example.

It has also been assumed that players and referees in a particular blob are oriented to be standing upright. That is, the players/referees are oriented so that the head is substantially at the top of the blob of interest. This assumption is useful because it allows for detection of people in groups by the use of foreground silhouette analysis. Obviously, the assumption is accurate for a significant percentage of the images observed. Yet, for a small percentage of images, it is noted that the players will not be in the assumed upright position. In order to account for this possibility, it is contemplated that the multiple or individual player blob can be rotated and processed by the techniques described herein. Rotation of the blob is accomplished by turning the blob by a fixed amount (e.g., ±90°) to one of a number of different orientations until player detection occurs or fails completely. When player detection occurs for reoriented blob, the original orientation of the blob is restored and the actual orientation is noted for the non-upright player being extracted from the blob.

Figure 8:
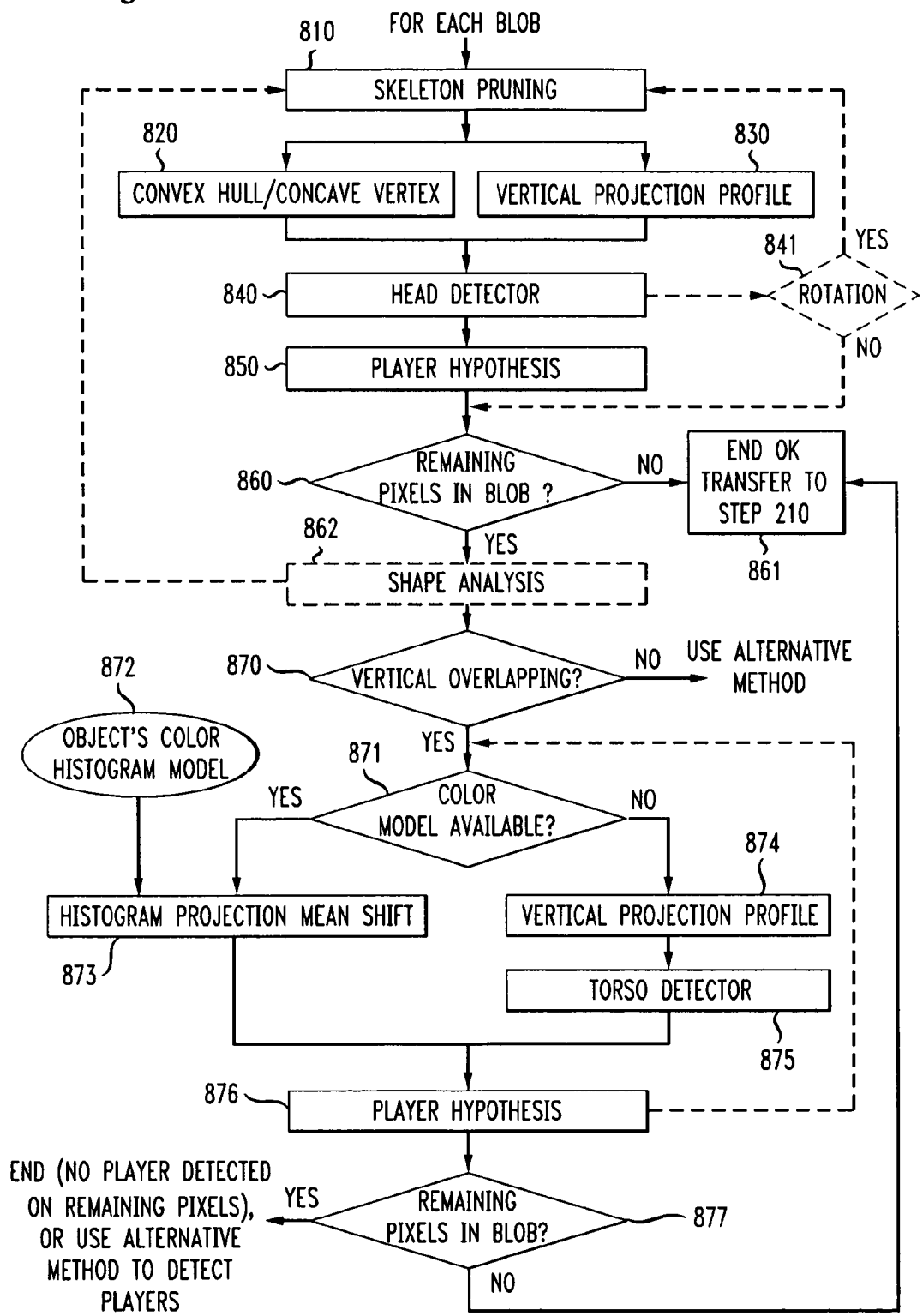
FIG. 8 illustrates a method for detecting and separating overlapped players.

From experimental practice, it has been determined that the method from FIG. 2 for identifying an isolated player/referee can be performed first and, if no detection occurs in that method, then the method from FIG. 8 for separating and identifying multiple overlapped players/referees can be performed. For example, the method in FIG. 8 could be entered from step 261 in the method of FIG. 2. It is contemplated that the method in FIG. 8 for separating and identifying multiple overlapped players/referees could be entered directly without the use of the method in FIG. 2 if, for example, the size and/or shape of a particular blob is greater than a given threshold that is generally indicative of a multiple player occlusion.

In step 810, a skeleton pruning process is performed on the multi-player blob in a manner similar to the skeleton pruning described above for the isolated blob to remove the artifacts caused by field lines/curves. If the method in FIG. 8 has been entered directly at the conclusion of the isolated player analysis method in FIG. 2, then the need for performing step 810 is actually lessened and the step can be skipped. Control of the process is then transferred to steps 820 and 830.

Steps 820 and 830 generally perform a characterization of the skeleton regions of the multi-player blob using particular analytical techniques. Detection of a head region is performed by extracting the concave vertexes of convex hull and calculating vertical projection profile. In step 820, a convex hull and concave vertex analysis is performed on the multi-player blob. Concurrently, in step 830, a vertical projection profile is generated from the multi-player blob. At the completion of each of steps 820 and 830, control of the method is transferred to step 840. Step 840 utilizes the information generated from the analyses in steps 820 and 830 to determine whether or not a head is present in the multi-player blob. Additionally, step 840 provides an indication for the location of the identified player's head in the multi-player blob. The analysis and detection of the head region for each multi-player blob is performed herein via a shape analysis rather than a color analysis.

For step 820, a convex hull or convex envelope for a set of points X, such as those in the multi-player blob, in a real vector space V is the minimal convex set containing X. Concave vertices may appear on the convex hull. It has been determined that constraints may be used for the detection of a player head. In one example from experimental practice, a constraint that the head should appear above the torso can be used to filter out non-head (concave) vertexes. In other words, the technique in steps 820 and 840 allow the head to be detected and located by finding an appearance of certain bulges in the convex hull. The filtered convex hull is supplied to step 840 for head detection.

Figure 5B:
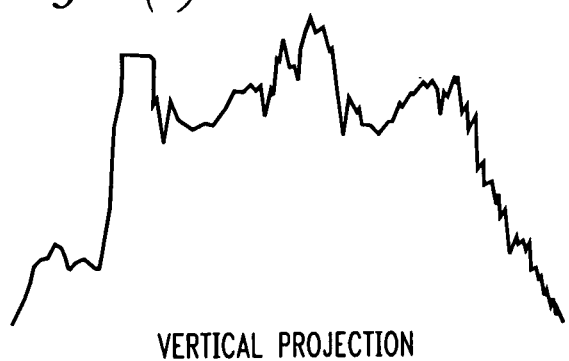

In a similar manner, step 830 produces a vertical projection profile of the multi-player blob from step 810. The vertical projection profile is shown by example in FIG. 5(b). This profile is produced by summing the number of multi-player blob pixels in each vertical slice of the multi-player blob. While the profile can be separated into individual sub-profiles based on color, the profile shown in FIG. 5 is not separated by colors into sub-profiles. From experimental practice, it has been found that significant peaks generally appear on the vertical projection profile in the vicinity of the player's head, when it is visible in the multi-player blob. In other words, the technique in steps 830 and 840 allow the head to be detected and located by finding a certain thickness in the vertical projection profile. The vertical projection profile is supplied to step 840 for head detection.

Step 840 uses the filtered convex hull from step 820 and the vertical projection profile from step 830 to detect whether a player's head is present in the multi-player blob. If a player's head is detectable from these analyses using the bulges in the convex hull and the thicknesses in the vertical projection profile as described above, then step 840 locates the head in the multi-player blob and provides a location for the head to step 850. Typically, the (x,y) coordinates are approximated for the center of the region of pixels determined as the head. These coordinates are then provided to step 850 for further use in processing.

In the event that a head cannot be detected, the method in FIG. 8 can proceed either to step 850 or to optional step 841. Since the head was not detected in step 840, the player hypothesis cannot be applied in step 850 and step 850 is effectively skipped. Without the application of the player hypothesis to the multi-player blob, the multi-player blob remains intact and no pixels are removed because no player or player head was detected in the multi-player blob. So when step 860 is reached, the multi-player blob will still include all the pixels that were presented to steps 820 and 830. Thus, step 860 will perform its analysis and transfer control on the "YES" branch.

If optional step 841 is selected from the unsuccessful completion of step 840, then the multi-player blob is rotated by a predetermined amount such as by +90°, that is, counter-clockwise. The rotation can be performed in step 841 in any direction and by any fixed amount. In order to reduce processing time, the fewer number of rotations and therefore the larger amount of degrees per rotation are desired. A determination is made concerning whether the multi-player blob has already been rotated through all possible orientations. If that determination reveals that all orientations have been performed for the particular multi-player blob, then no further orientation changes are made and the process is returned to step 860. On the other hand, if that determination reveals that all orientations have not been performed for the particular multi-player blob, then the orientation change is made and the process is returned to step 810. In an alternative embodiment, it is contemplated that the process control can skip step 810 and proceed directly to steps 820 and 830. This alternative is based on the recognition that, since the blob has already been pruned in prior processing, the application of further pruning will not necessarily change the characteristics of the blob further.

When step 850 is reached, the player hypothesis is applied to the multi-player blob. In one example from experimental practice, the player hypothesis was selected to be an elliptical player blob having an upright orientation. While other shapes may be used for the player hypothesis, the ellipse has provided the greatest degree of robustness for this application. The size of the ellipse need not be fixed and, in fact, it can be variable. It has been found to be useful to review player statistical information concerning, for example, height, width, height/width ratios, and the like when determining the size of the particular ellipse to employ. It has been determined that the minor axis of the elliptical player blob can be calculated by using average height/width ratio for the players. The major axis of the elliptical player blob can be calculated by using a range of player heights. When the height for the identified player in the multi-player blob measured along the vertical or major ellipse axis is estimated to be bigger than a desired maximum, the major axis is adjusted to the maximum height in the range of player heights. Other techniques are contemplated for varying the player hypothesis (i.e., elliptical player blob) to handle the variability of player sizes and heights.

In step 850, at the horizontal location of the head candidate, the elliptic player blob is positioned so that one end of the major axis is located at the identified head location and so that the axis extends vertically downward from the head location through the first point that turns to a background pixel. The size of the ellipse is typically based on height, at least in part, for the length of the major axis. As such, the ellipse can be assumed to cover much, if not all, of the player's body. However, from experimental practice, it is understood that the first background pixel may, on occasion, be reached before a player's foot is reached. The minor axis is calculated by using the average height/width ratio of players, generally known in advance. The elliptical player blob is now positioned to be sufficiently coextensive with the detected player. The number of pixels within the elliptical player blob is tested against a threshold. If the threshold is exceeded (for example, if 75% of the elliptical player blob area is occupied by player pixels), then those pixels from the multi-player blob are identified as an individual player. When identified as an individual player, it is understood that the orientation of that player is also identified for these pixels in the event the multi-player blob underwent a rotation in optional step 841. The identified player pixels, that is, the pixels of the multi-player blob enclosed by the elliptical player blob, are then subtracted from the multi-player blob. If the threshold is not exceeded, then the generated player hypothesis is eliminated or removed as an indication that no player has been detected. The multi-player blob, whether reduced in size by the elimination of the identified player or whether the original unreduced multi-player blob, is then supplied to step 860.

As already noted above, the method in FIG. 8 performs horizontal overlap detection in the first instance via steps 810, 820, 830, 840, and 850 as well as in the optional steps. In step 860, it is determined whether there are a sufficient number of pixels remaining in the multi-player blob to continue processing. When there are a sufficient number of pixels remaining in the multi-player blob to continue processing, control is then transferred to step 870.

An optional step, step 862, may be inserted in the path from step 860 to step 870. This optional step includes some additional processing to determine the multi-player blob shape that existed in step 850 prior to the removal of the identified player. The shape of this multi-player blob, prior to elliptical player blob extraction, can provide an indication of the orientation of the players in the multi-player blob. The shape may be indicative of players horizontally overlapping because the shape exhibits horizontal elongation or vertically overlapping because the shape exhibits vertical elongation. This information can then be used to assist the determination of whether, if enough pixels remain in the multi-player blob from step 860, to transfer control to step 810 or to step 870. Of course, it is also possible to simply determine to transfer control to step 870 without the additional processing for shape analysis. In the event that it is determined in step 860 that there are not enough pixels remaining in the multi-player blob from step 860, then control is transferred to step 210 in FIG. 2 to perform a further analysis on the remaining pixels in the multi-player blob to see whether they correspond to a particular object of interest such as a ball. It is also possible at this point to simply end the process rather than transferring control to step 210. This latter decision can be premised on a determination that the number of pixels remaining in the multi-player blob from step 860 is less than a second processing threshold. That is, there are too few pixels or connected shapes in the multi-player blob to be of further interest for potential object extraction. It will be appreciated that the functions performed in optional step 862 may be incorporated into the existing functionality of step 860.

As mentioned above, step 870 begins a vertical overlap player detection process for the remaining pixels in the multi-player blob. In vertical overlap situations, it is expected that one or more entire regions of the overlapped player may be obscured and therefore missing in the image. In contrast, for most horizontal overlap situations, it is expected that only a portion of one or more regions of the overlapped player may be obscured and therefore missing in the image so that portions of all or almost all of the regions for the overlapped player are visible. In vertical overlapped scenes, it is also expected that the head of one or more players will be located in the interior of the foreground blobs, for example, as shown in FIG. 6(*a*). So in order to proceed with the vertical overlapping processing, it must first be determined whether the players in the multi-player blob exhibited vertical overlap.

Vertical overlapping may be detected by analyzing the shape elongation of the multi-player blob before the elliptical player blob was extracted in step 850. When the shape of that multi-player blob exhibits vertical elongation then step 870 proceeds along the "YES" branch to step 871. When vertical elongation of the multi-player blob is not discovered, then step 870 proceeds to the "NO" output branch. In this latter case, alternative methods known in the art may be used to identify players in the multi-player blob or processing of the particular multi-player blob may be terminated. Although not shown as such, step 870 may be eliminated or skipped altogether so that the method proceeds directly to step 871. This can be done because it can be assumed that players in the remaining pixels after step 860 will be at least partially overlapped vertically. Also, this step may be eliminated to avoid redundancy when the shape analysis is performed in optional step 862.

The vertical overlap detection portion of the present method is implemented by performing analyses alternatively based on a color model in steps 871, 872, and 873 and based on a shape analysis in steps 874 and 875. In order to reach the color model analysis, it must first be determined whether the color model for the object of interest is available. This test is performed in step 871. If the color model in step 872 is available, control is transferred to step 873. If the color model is not available, then control is transferred to step 874. Appearance models such as those based on color (shown in step 872) and, more particularly, upon color in a particular region of interest can contribute to a calculation of likelihood maps for separating occluded players. This is possible even though significant portions of the players' bodies are not visible because indicative color patterns such as those on shorts, shirts, and even socks may be clearly visible and identifiable.

If player appearance models are available in step 872, the process proceeds from step 871 to step 873. To cope with this occlusion problem, a nonparametric statistical technique such as a histogram projection mean shift analysis analyzes the multi-player blob in view of the object's color histogram model to find a local mode, that is, a local maximum, as shown in step 873. This mode is then used as a most likely position for locating a player hypothesis in the multi-player blob. The analysis in this step may also produce other modes that are less attractive, on a likelihood basis, for locating a player hypothesis in the multi-player blob. These other modes may be used in subsequent processing if the positioning of the player hypothesis in step 876 fails to yield an identifiable player.

A color histogram and its generation are well known to persons skilled in the art of this technical field. The color histogram utilized in the appearance model would show the distribution of pixels in an image over all possible colors. In such a color histogram, the value of each bin of the histogram, where a bin represents one color or one group of similar colors, would correspond to the proportion of pixels in the entire model with that color. It should be noted that the model for a player will substantially correspond to the color histogram for an image of an individual player.

It is understood that other nonparametric statistical technique may be useful in this analysis. The details of a histogram projection mean shift analysis are understood to be well known and, as such, will not be discussed in any further detail.

As step 873 proceeds, a mean shift iteration is performed to seek the local mode for each color histogram model that is learned a priori corresponding to each player team and each referee. Mean shift is a procedure for locating stationary points of a density function given discrete data sampled from that function. It is useful for detecting the modes of this density. Eventually each detected mode is associated with a player candidate. The similarity between the local mode and the object model is measured by the Bhattacharyya coefficient. The Bhattacharya coefficient is an approximate measurement of the amount of overlap between two statistical samples. The coefficient can be used to determine the relative closeness of the two samples being considered. The highest similarity score that is over a given threshold initializes the player (referee) hypothesis. In other words, it is then possible to determine the location for the elliptical player blob in step 876.

If the player appearance model is not provided or available in advance, the process proceeds to steps 874 and 875, where the horizontal projection profile of the foreground blob provides information about vertical locations of different player regions. As shown in FIG. 4, the player (referee) appearance can simply be subdivided into three regions vertically: a shirt region, a shorts region, and a socks region. Assuming that a range of torso thickness is known according to the camera configuration in step 875, it is possible to detect flat peaks of the smoothed horizontal silhouette projection profile shown in FIG. 6(*b*). Also, it is then possible to combine the flat peak location information with the locations of detected peaks/valleys on the smoothed horizontal color projection profile shown in FIG. 6(*c*) for generating a location for the elliptical player blob in player hypothesis step 876.

Step 876 performs the player hypothesis step in which the elliptical player blob is positioned over the multi-player blob using information furnished from either the appearance (color model) analysis from step 873 or the shape analysis from steps 874 and 875. Step 876 operates in a manner that is substantially identical to the functionality of step 850.

Also in step 876, elliptic shape constraints are employed for removing false hypothesis of player locations when certain unexpected situations occur. Such situations may occur when, for example, overlapped players are completely dressed in one color, or when different teams share similar colors albeit on different parts of their clothes. It should be understood that the shape constraints described above do not operate on the location of the ellipse (provided by 873 or 875), but rather they operate on its shape. For example, if the ellipse is too tall via the major axis because of the location of the first background pixel, for example, then the size of the ellipse will be limited by height to the maximum predefined size for a player. In another example, if the ellipse is too wide, then it will be removed or limited in size based on a pre-defined aspect ratio for players. It is contemplated that shape constraints based on other considerations can be determined without departing from the teachings herein.

At the completion of step 876, it will be determined whether a player has been identified in the multi-player blob. When the player is identified, the pixels within the elliptical player blob corresponding to the identified player are removed and the control of the process is transferred to step 877. When the player cannot be identified, an optional path may be taken where control is transferred back to step 871 so that the processing can be performed for a mode (location) that is next best to the one just used.

Step 877 operates in a manner similar to step 860 so that, if there are remaining pixels after checking the player hypothesis in step 876, the decision in step 877 produces a "YES" output and an alternative method can then be used to detect players or other types of objects. One such alternative method is invoked at step 210 of FIG. 2. In the event that the decision in step 877 produces a "NO" output, the control of the method is transferred to step 861.

From experimental practice, exemplary values that can be used for the constants/thresholds mentioned herein are listed below:

| Constant/threshold | $a_s$ | $ar_{max}$ | $ar_{min}$ | $b_s$ | c | $d_h$ | $d_v$ | $e_{max}$ | $f_{max}$ | pw | yw |
|---|---|---|---|---|---|---|---|---|---|---|---|
| Exemplary value | 0.6 | 80 | 3 | 150 | 0.2 | 2 | 4 | 3 | 2 | 0.5 | 0.8 |

The description of the invention herein includes one or more exemplary implementations each having particular features and aspects. As mentioned above, it is contemplated that features and aspects of described implementations are adaptable for other implementations. For example, the principles of this invention can be applied to detecting and separating overlapped objects in other playfields, such as a football field or other fields involving individual or group activity. Although implementations described herein may be described in a particular context, such descriptions are not intended to be taken in any manner as limiting the features and concepts of this invention only to such disclosed implementations or contexts.

Additional implementations are contemplated by this disclosure. For example, additional implementations may be created by combining, deleting, modifying, or supplementing various features of the disclosed implementations.

The implementations described herein may be implemented as, for example, a method or process, an apparatus, or a software program. Even though the presentation of the features of this invention has been in the context of a method, persons skilled in the art will discern that the invention may be embodied as, for example, an apparatus or a software program. An apparatus may be implemented in, for example, appropriate hardware, software, and firmware. The methods may be implemented in, for example, an apparatus such as a computer or other processing device, for example. Additionally, the methods may be implemented by instructions being performed by a processing device or other apparatus, and such instructions may be stored on a computer readable medium such as, for example, a CD or other computer readable storage device, and an integrated circuit.

While this invention has been described as having a preferred embodiment, the present invention can be further modified within the spirit and scope of this disclosure. This application is therefore intended to cover any variations, uses, or adaptations of the invention using its general principles. For example, other types of objects may be located and tracked, and false alarms and artifacts may be identified for other types of objects or other types of game videos. This application is intended to cover such departures from the present disclosure as come within known or customary practice in the art to which this invention pertains and which fall within the limits of the appended claims.

The invention claimed is:

1. A method for detecting and isolating overlapping human objects in an image of a playfield, the image comprising a plurality of playfield and non-playfield pixels, the method comprising:
   extracting, by a processor, a plurality of substantially non-playfield pixels from the image as a candidate object;
   generating, by the processor, shape information from the candidate object;
   detecting, by the processor, in at least a portion of the candidate object presence of at least one human characteristic at a position by analyzing one or more features of the shape information for the candidate object;
   identifying, by the processor, a subset of the plurality of image pixels included in said candidate object as representative of the human object, wherein the subset is positioned based at least in part on the position of the at least one characteristic detected in at least the portion of the candidate object; and
   removing, by the processor, from the candidate object the subset of pixels associated with the human object.

2. The method as defined in claim 1, wherein the step of generating shape information comprises:
   generating, by the processor, a convex hull from the candidate object to include substantially all the pixels associated with the candidate object.

3. The method as defined in claim 2, wherein the at least one characteristic is a human head, wherein the one or more features of the shape information includes at least one concave vertex on the convex hull, and wherein the detecting step further comprises detecting, by the processor, the at least one concave vertex on the convex hull in order to determine the position for said human head.

4. The method as defined in claim 1, wherein the step of generating shape formation comprises:
   generating, by the processor, a convex hull from the candidate object to include substantially all the pixels associated with the candidate object;
   generating, by the processor, a vertical projection profile of the candidate object, wherein the vertical projection profile represents an amount of non-playfield pixels present in each vertical slice through said candidate object.

5. The method as defined in claim 4, wherein the at least one characteristic is a human head, wherein the one or more features of the shape information includes at least one concave vertex on the convex hull and at least one peak along the vertical projection profile, and wherein the detecting step further comprises:
   detecting, by the processor, the at least one concave vertex on the convex hull in order to identify a first position for said human head in said candidate object;
   detecting, by the processor, at least one peak along the vertical projection profile in order to identify at least a second location for said human head in said candidate object; and
   selecting, by the processor, the position for the human head based at least in part on the first and second positions.

6. The method as defined in claim 5, wherein the selecting step comprises:
   applying, by the processor, one or more constraints to the selecting so that the position of the human head appears in a substantially upper region of the candidate object corresponding to a head position for an upright human object.

7. The method as defined in claim 5, wherein the step of identifying the subset of pixels further comprises:
   positioning, by the processor, one end of a major axis of an elliptical model substantially at the position selected for the human head;
   positioning, by the processor, another end of the major axis of the elliptical model at a first pixel that represents a non-playfield pixel substantially along the major axis, wherein the major axis is aligned in a substantially vertical direction; and
   adjusting, by the processor, a minor axis of the elliptical model to have a length, which when combined in a ratio with the major axis length corresponds substantially to a desired width and height ratio for the human object.

8. The method as defined in claim 7, wherein the desired width and height ratio is selected from a group consisting of an average width/height ratio, a maximum width/height ratio, and a minimum width height ratio.

9. The method as defined in claim 7, wherein the step of identifying the subset of pixels further comprises:
   determining, by the processor, a number of pixels in the subset of pixels included within a perimeter of the elliptical model; and
   when the number of pixels is less than a prescribed threshold, ceasing, by the processor, all positioning and formation of the elliptical model.

10. The method as defined in claim 1, the method further comprising:
    determining, by the processor, a number of pixels remaining in the candidate object upon removal of the subset of pixels associated with the human object; and
    when the number of pixels is less than a prescribed threshold, removing, by the processor, the candidate object from further processing.

11. The method as defined in claim 10, the method further comprising:
    when the number of pixels is at least greater than the prescribed threshold, repeating, by the processor, the method steps beginning at the step of generating shape information.

12. The method as defined in claim 10, the method further comprising:
    when the number of pixels is at least greater than the prescribed threshold, determining, by the processor, whether the overlapping human objects overlap in a substantially vertical manner by generating the shape information of the candidate object with respect to at least vertical elongation of the candidate object.

13. The method as defined in claim 12, wherein the at least one characteristic is a human torso, wherein the one or more features of the shape information includes at least one flat peak region along a horizontal projection profile, the method further comprises:
    when the candidate object is determined to include vertically overlapping human objects, generating, by the processor, a horizontal projection profile of the candidate object, wherein the horizontal projection profile represents an amount of non-playfield pixels present in each horizontal slice through said candidate object; and
    detecting, by the processor, the at least one flat peak region along the horizontal projection profile in order to identify a location for said human torso in said candidate object.

14. The method of claim 13, wherein the method further comprises:
    second identifying, by the processor, a second subset of the plurality of image pixels included in said candidate object as representative of the human object, wherein the second subset is positioned based at least in part on the position of the human torso detected in the candidate object, said second identifying comprising:
  positioning a major axis of an elliptical model to be aligned substantially vertically through substantially the position for the human torso;
  positioning one end of the major axis of the elliptical model at a first pixel that represents a non-playfield pixel substantially along the major axis; and
  adjusting a length of the major axis so that with respect to said torso location, another end of the major axis is positioned substantially at a position for a human head; and
  adjusting a minor axis of the elliptical model to have a length, which when combined in a ratio with the major axis length corresponds substantially to a desired width and height ratio for the human object.

15. The method as defined claim 14, wherein the method further comprises:
  removing, by the processor, from the candidate object the second subset of pixels associated with the human object.

16. The method as defined in claim 12, wherein the method further comprises:
  when the candidate object is determined to include vertically overlapping human objects, performing, by the processor, a color-based analysis of said candidate object to determine a first location for a human object; and
  second identifying, by the processor, a second subset of the plurality of image pixels included in said candidate object as representative of the human object, wherein the second subset is positioned based at least in part on the position of the human object detected in the candidate object, said second identifying comprising
    positioning an elliptical model to be aligned with its major axis substantially vertical through substantially the location determined for the human object;
    adjusting a length of the major axis and a length of the minor axis to correspond substantially to a desired height and width ratio for the human object.

17. The method as defined claim 16, wherein the method further comprises:
  removing, by the processor, from the candidate object the second subset of pixels associated with the human object.

18. The method as defined in claim 1, further comprising:
  rotating, by the processor, the candidate object by a desired number of degrees before generating the shape information.

* * * * *